US007266828B2

(12) United States Patent
Inoue

(10) Patent No.: US 7,266,828 B2
(45) Date of Patent: Sep. 4, 2007

(54) DISK DRIVE DEVICE

(75) Inventor: Yoshihisa Inoue, Saitama (JP)

(73) Assignee: Shinwa Co., Ltd., Tokyo (JP)

( * ) Notice: Subject to any disclaimer, the term of this patent is extended or adjusted under 35 U.S.C. 154(b) by 384 days.

(21) Appl. No.: 10/905,349

(22) Filed: Dec. 29, 2004

(65) Prior Publication Data

US 2005/0160439 A1 Jul. 21, 2005

(30) Foreign Application Priority Data

Jan. 15, 2004 (JP) ............................ 2004-008249

(51) Int. Cl.
*G11B 17/04* (2006.01)

(52) U.S. Cl. ...................................................... 720/621

(58) Field of Classification Search ................ 720/619, 720/621

See application file for complete search history.

(56) References Cited

U.S. PATENT DOCUMENTS 4,682,320 A * 7/1987 d'Alayer de Costemore d'Arc ... 720/621
5,886,968 A * 3/1999 Nakamichi .................. 720/622
5,909,420 A * 6/1999 Nakamichi .................. 720/622
6,028,831 A * 2/2000 Scholz et al. ............... 720/621
6,785,898 B1 * 8/2004 Nakamichi .................. 720/621
7,007,285 B2 * 2/2006 Suzuki ....................... 720/621
2001/0043553 A1 11/2001 Haupt et al.
2002/0018437 A1 * 2/2002 Kletzl ........................ 369/192
2006/0143631 A1 * 6/2006 Watanabe ................... 720/621

FOREIGN PATENT DOCUMENTS

JP 2003-257110 9/2003

* cited by examiner

*Primary Examiner*—Allen Cao
(74) *Attorney, Agent, or Firm*—Carrier, Blackman & Associates, P.C.; Joseph P. Carrier; William D. Blackamn

(57) ABSTRACT

A disk drive device equipped with a disk transfer mechanism for loading a disk into and out of a play position that does not increase the complexity of the overall structure and the size of the housing. The device comprises a tray for supporting a disk within the housing, first and second transfer rollers carried by arms, that are resiliently urged against the peripheral edge of the disk, and spaced from each other along a side of the tray to apply a rotational force to a side peripheral edge of the disk, and fixed guide members for supporting the other side peripheral edge of the disk that is inserted from the slot.

11 Claims, 7 Drawing Sheets

DISK DRIVE DEVICE

RELATED APPLICATIONS

This application is based on the Japanese patent application No. 2004-8249 filed Jan. 15, 2004, and the contents of this application are hereby incorporated in the present application by reference.

TECHNICAL FIELD

The present invention relates to a disk drive device, and in particular to a disk drive device which is provided with a disk transfer mechanism for automatically drawing (loading) an information storage disk inserted from a slot into a prescribed position within a housing, and automatically ejecting (unloading) the disk upon receipt of an eject command

BACKGROUND OF THE INVENTION

It is known to apply an elongated rubber roller against a surface of a compact disk (which is referred to as CD hereinafter) and transfer the CD by means of the frictional engagement between the disk surface and the roller that is rotatively driven (See Japanese patent laid-open publication No. 2003-257110). However, according to this arrangement, the smear that may be deposited on the rubber roller may be transferred onto the CD, and any slippage that may occur between the rubber roller and disk surface may prevent the retracting movement to be effected in a stable manner.

To eliminate such a problem, it is also proposed to apply a roller to the peripheral edge of a CD, and rotatively drive the roller (See US2001-0043553A1).

In recent years, CD players equipped with an auto-changer mechanism are gaining popularity. In such a player, a plurality of CDs are stored in a plurality of trays that are stacked one upon another so that any one of the CDs may be selectively transferred to a play position. In such a case, if the CD is transferred by using a roller that engages the peripheral edge of the CD, the overall structure tends to be unacceptably complex, and the overall size of the player housing has to be increased to avoid the interferences between the auto-changer mechanism and the turntable mechanism for spinning the CD.

BRIEF SUMMARY OF THE INVENTION

In view of such problems of the prior art, a primary object of the present invention is to provide a disk drive device using a disk guide that engages only the peripheral edge of the disk for loading and unloading the disk.

A second object of the present invention is to provide a disk drive device using a disk transfer mechanism that is simple in structure and reliable in operation.

A third object of the present invention is to provide a disk drive device using a disk transfer mechanism that transfers the disk along a substantially straight path and minimizes the space requirement in the housing.

According to the present invention, such objects can be at least partly accomplished by providing a disk drive device, comprising: a housing defining a slot for receiving and ejecting an information storage disk; at least one tray provided in the housing for selectively supporting an information storage disk; a first transfer roller provided in the housing adjacent to an end of the slot for engaging a peripheral side edge of the disk, the first transfer roller being provided with a pivot center extending perpendicularly to the slot; an electric motor for rotatively actuating the first transfer roller; and a first fixed guide member provided in the housing adjacent to the other end of the slot for engaging an opposite peripheral side edge of the disk.

Thus, as the disk is inserted into the slot, the disk is engaged both by the first fixed guide member and first transfer roller at the outer peripheral edge thereof so that the first transfer roller moves the disk inwardly into the housing while the disk rolls over the first fixed guide member. In other words, the first fixed guide member in a way provides a pivot point for the inward movement of the disk.

According to a preferred embodiment of the present invention, the first transfer roller is pivotally attached to a free end of a first arm having a base end pivotally attached to a part of the housing so as to be rotatable around a pivot center located behind the first transfer roller and extending in parallel with the pivot center of the first transfer roller, and the device further comprises a spring member that resiliently urges the free end of the first arm inwardly toward the peripheral side edge of the disk.

Thereby, the first transfer roller can follow the arcuate contour of the outer peripheral edge of the disk even though the first fixed guide member remains stationary, and favorably accommodate the movement of the disk as it moves into the housing.

Preferably, the disk drive device further comprises a second transfer roller located more rearwardly in the housing than the first transfer roller and pivotally attached to a free end of a second arm having a base end pivotally attached to a part of the housing so as to be rotatable around a pivot center located in front of the second transfer roller and extending in parallel with the pivot center of the second transfer roller, and the device further comprises a spring member that resiliently urges the free end of the second arm inwardly toward the peripheral side edge of the disk.

The second transfer roller takes over the first transfer roller in transferring the disk from an external position to an internal position. The first transfer roller takes over the second transfer roller in retrieving the disk from the internal position to the external position. Thereby, the disk can be transferred into and out of the housing substantially along a straight path so as to minimize the space required for the guide mechanism. In particular, the base ends of the first and second arms may be pivotally supported by a common shaft so as to minimize the necessary space and the number of component parts. The internal position of the disk may consist of a play position. When an auto-changer mechanism is used, the internal position may also be a stacking position.

When the disk is placed in the play position, it is necessary to disengage the various elements of the guide mechanism from the peripheral edge of the disk. For this purpose, the disk drive device may further comprise a lever arm adapted to retract the second transfer roller away from the peripheral edge of the disk to a position clear from the disk by using suitable means when the disk is at the play position. When an auto-changer mechanism is used, this action may be effected in cooperation with the auto-changer mechanism.

To guide the disk along a straight path deep into the housing, the disk drive device may further comprise a second fixed guide member provided along a side of the tray for engaging the opposite peripheral side edge of the disk. It is preferable to provide a moveable guide member along a side of the tray for selectively retaining the disk against an upward movement. Thereby, the disk may be favorable retained by the tray, and is prevented from inadvertent movement even when subjected to extreme shocks and vibrations. In this case, it is preferable to provide a lever arm adapted to actuate the moveable guide member between a deployed position for retaining the disk against upward movement thereof and a retracted position for permitting upward movement of the disk from the tray, typically, in cooperation with the auto-changer mechanism.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
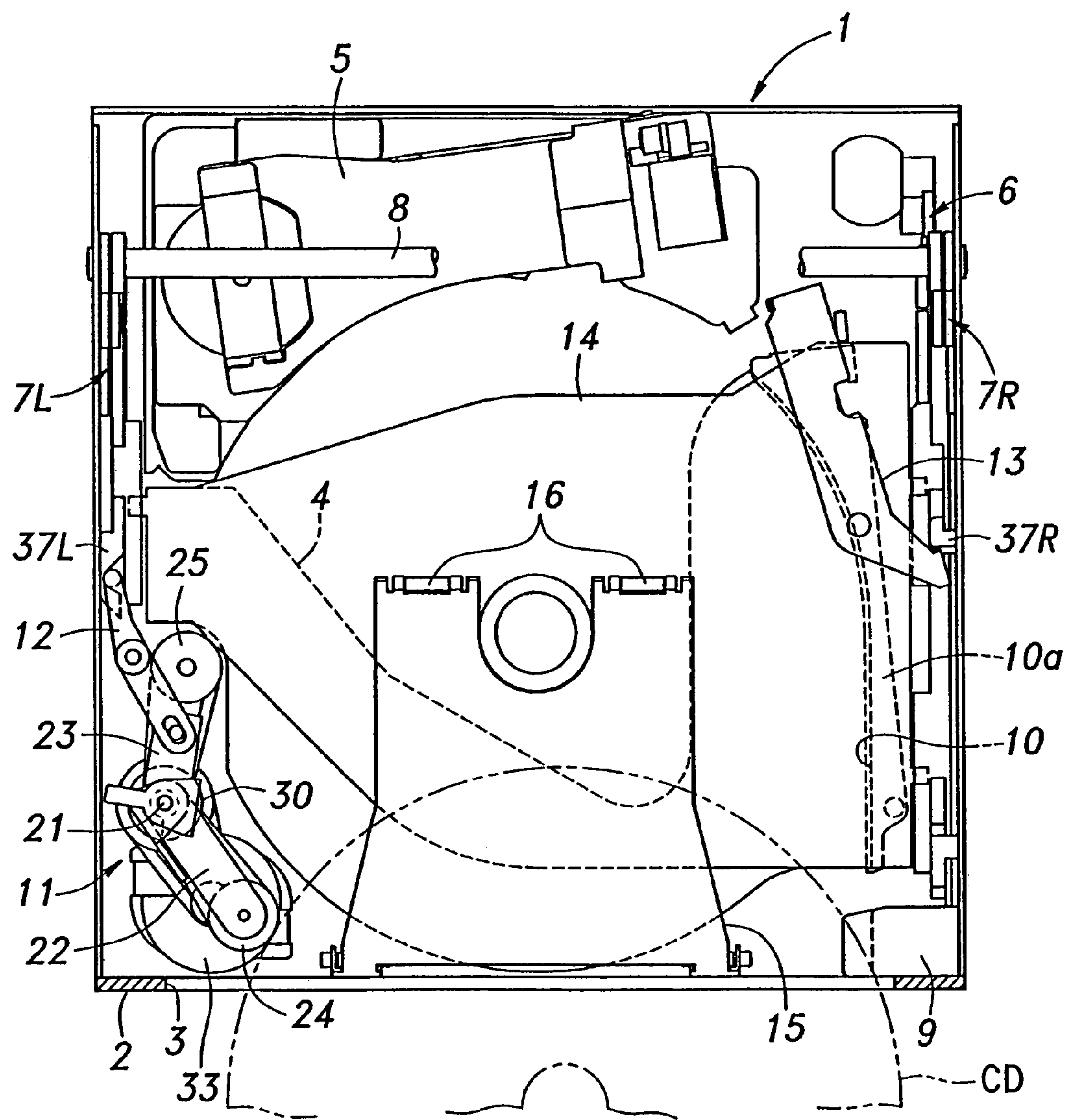
FIG. 1 is a partly broken-away plan view of the disk drive device embodying the present invention.

FIG. 1 is a plan view of an onboard disk drive device incorporated with a disk transfer mechanism embodying the present invention. This onboard disk drive device 1 is provided with a rectangular box-shaped housing dimensioned so as to fit into a single DIN standard aperture of an automobile. The housing is provided with a front panel 2 defining a slot 3 adapted to receive a CD having a diameter of 120 mm. A tray assembly including a stack of trays 4 each adapted to retain a CD is provided centrally in the housing. A pivot shaft extending upright from the bottom panel in a rear part of the housing pivotally supports a drive arm 5 that supports a turntable fitted with a disk damper as well as a drive motor for turning the turntable, a data read head and a head drive motor. The right rear corner of the housing receives a changer actuating unit 6 for providing an actuating force to an auto-changer mechanism, and a synchronizing shaft 8 extends laterally in an upper rear part of the housing to synchronize the actions of the two halves 7L and 7R of the auto-changer mechanism.

The disk drive device according to the present invention is employed in combination with the auto-changer mechanism comprising a tray base that generally lifts and lowers a plurality of trays 4 stacked one over the other by engaging them to inclined cam slots of cam plates adapted to move in the fore-and-aft direction, and another cam plate that is provided with a cam slot for placing a selected one of the trays to a play position by moving in the fore-and-aft direction. However, the auto-changer mechanism may be selected from any of the known arrangements, and is not described in any detail herein. For more specific details of the auto-changer mechanism of the illustrated embodiment, reference should be made to Japanese patent laid-open publication No. 11-296954 (U.S. Pat. No. 6,226,253).

Adjacent to the right end of the slot 3 is provided a first fixed guide member 9 having a slot for guiding a peripheral edge of a CD in a horizontal orientation. Along the right side portion of each tray 4 is provided a second fixed guide member 10 that guides the peripheral edge of the CD in cooperation with the first fixed guide member 9, and a moveable guide plate 10*a* that extends along the upper surface of the second fixed guide member 10 to retain the inserted CD from above. This moveable guide plate 10*a* is provided with an end that is pivotally attached to a right front corner of the corresponding tray 4 adjacent to the slot 3 so that the free end of the moveable guide plate 10*a* can laterally rotate around this pivot point. The moveable guide plate 10*a* is resiliently biased by spring means (not shown in the drawing) in the inward direction or to a position to retain the disk on the corresponding tray 4 against upward movement. The left front corner of the trays 4 adjacent to the slot 3 is provided with a disk transfer mechanism 11 of the present invention. The disk transfer mechanism 11 is enabled to transfer a disk into and out of the housing in cooperation with the first fixed guide member 9 and second fixed guide members 10.

A first release lever 12 is pivotally attached to a left end portion of the inner surface of the top panel (omitted from illustration in FIG. 1) of the housing at an intermediate part thereof to serve a means for retracting the transfer mechanism 11 as described hereinafter. A second release lever 13 is similarly pivotally attached to a right end portion of the inner surface of the top panel of the housing at an intermediate part thereof to serve a means for retracting the corresponding moveable guide plate 10*a* as described hereinafter. An end of a pressure plate 15 that applies a downward pressure, via a pair of rollers 16, to an upper plate 14 which is laid over the uppermost tray 4 is pivotally attached to an end portion of the inner surface of the top panel of the housing adjacent to the slot 3.

The pressure plate 15 is resiliently urged by a torsion coil spring (not shown in the drawings) wound around a pivot shaft of the pressure plate 15 so that the rollers 16 provided on the free end of the pressure plate 15 may engage the upper surface of the upper plate 14 at all times. Thereby, the multiple trays 4 are prevented from rattling.

Figure 2:
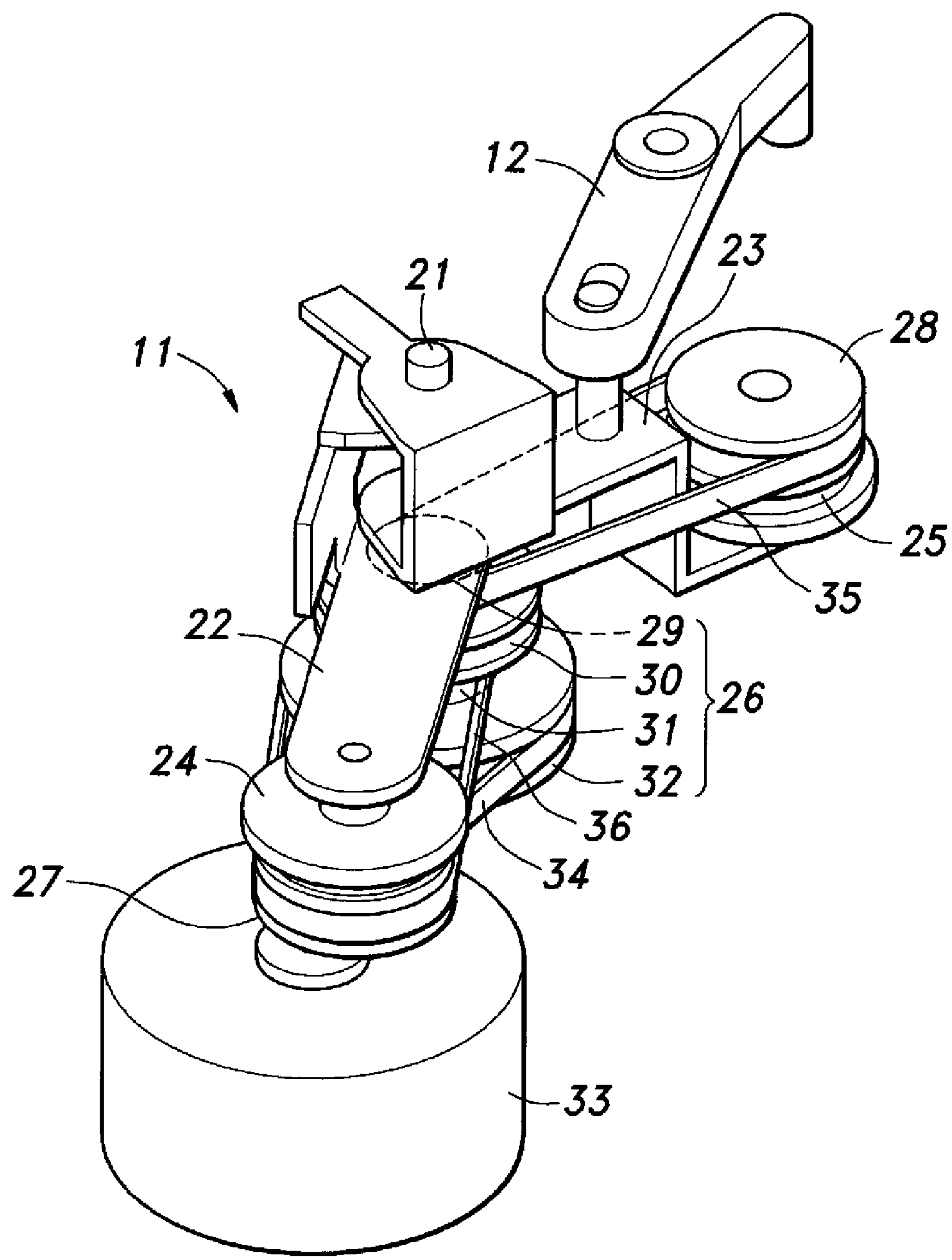
FIG. 2 is an enlarged perspective view of the disk transfer mechanism incorporated in the disk drive device.

FIG. 2 is a perspective view of the disk transfer mechanism 11 according to the present invention. This transfer mechanism 11 comprises a pair of arms 22 and 23 having base ends pivotally attached to a center shaft fixed to the bottom panel of the housing and free ends extending in opposite directions along the outer peripheral contour of the disk, first and second transfer rollers 24 and 25 pivotally supported by the free ends of the two arms 22 and 23, respectively, and a rotor 26 rotatably attached to the center shaft 21. The first and second transfer rollers 24 and 25 are integrally formed with respective pulleys 27 and 28. The rotor 26 is integrally formed with an upper pulley 29, an intermediate transfer roller 30, a lower pulley 31 and a driven pulley 32, in that order from the top to the bottom.

The first transfer roller 24 is placed adjacent to the slot 3 and rotatively driven so as to engage the left peripheral edge of the CD inserted from the slot 3 and transfer the CD into the housing. When the CD is ejected out of the housing, the first transfer roller 24 pushes the CD out of the slot 3 for retrieval by the user. The second transfer roller 25 is located to the left of the trays 4 so as to engage the edge of the CD supported by one of the trays 4. As the second transfer roller 25 rotates, the CD transferred into the housing is eventually placed on the corresponding tray 4. When ejecting the CD, the rotation of the second transfer roller 25 causes the CD to move out of the tray 4. The intermediate transfer roller 30 serves as a guide that transfers the CD between the first roller 24 and second roller 25.

The first roller 24 and second roller 25 that are arranged in a mutually spaced relationship along the path of transferring the CD are provided with the respective pulleys 27 and 28. As can be appreciated from FIG. 2, the pulley 27 for the first roller 24 is provided below the first roller 24, and the pulley 28 for the second roller 25 is provided above the second roller 25. Thus, the three transfer rollers 24, 30 and 25 are located at a same height so that the CD may be engaged by the transfer rollers one after the other. The parts of the first and second transfer rollers 24 and 25 that engage the CD are covered by rubber material to increase the frictional coefficient. The intermediate transfer roller 30 is made of a material having a relatively low frictional coefficient as compared with the first and second transfer rollers 24 and 25 so that the CD that is being transferred by the intermediate transfer roller 30 may slip relative to the same when required. Owing to this slip, the difference between the transfer speeds of the first and second transfer rollers 24 and 25 and intermediate transfer roller 30 may be accommodated, and the transfer of the CD between the first and second transfer rollers 24 and 25 may be effected without any problem.

The driven roller 32 that is located at a lowermost position of the rotor 26 is connected, via a belt 34, to the drive shaft of a transfer motor 33 located under the first transfer roller 24 adjacent to the slot 3 of the housing. The upper pulley 29 of the rotor 26 is connected to the second transfer roller 25 via a belt 35 and pulley 28 integral with the second transfer roller 25, and the lower pulley 31 of the rotor 26 is connected to the first transfer roller 24 via a belt 36 and pulley 27 integral with the first transfer roller 24. Therefore, the drive force of the transfer motor 33 rotates the rotor 26, and this in turn causes the first, second and intermediate transfer rollers 24, 25 and 30 to rotate simultaneously in the same direction.

The two arms 22 and 23 that support the first and second transfer rollers 24 and 25, respectively, are resiliently urged by a torsion coil spring (generally indicated by broken lines in FIG. 1) wrapped around the center shaft 21 and provided with free ends that engage the respective arms 22 and 23, in the direction to reduce the angle formed between the two arms 22 and 23. As a result, the first and second transfer rollers 24 and 25 are resiliently urged against the peripheral edge of the CD. The angle between the two arms 22 and 23 in the neutral state is defined by mechanical stoppers (not shown in the drawings) as illustrated in FIG. 1.

Now the mode of loading a CD in the illustrated disk drive device according to the present invention is described in the following.

A CD is retained by a user by engaging the inner peripheral edge of the CD with a forefinger and a rear end of the outer peripheral edge of the CD with a thumb, and is inserted into the slot 3 opening in the front panel 2 of the housing. The insertion of the CD is detected by a mechanical or optical switch which in turn actuates the transfer motor 33. As a result, the rotor 26 connected to the motor 33 via the belt 34 starts rotating, and the first and second transfer rollers 24 and 25 that are connected to the upper and lower pulleys 29 and 31 of the rotor 26 via the belts start rotating both in the counter clockwise direction in FIG. 1. Once the outer peripheral edge of the CD engages both the first fixed guide member 9 provided to the right of the slot 3 and the first transfer roller 24 provided to the left of the slot 3 at the same time, the rotational force of the first transfer roller 24 causes a clockwise moment that is centered around the point of contact between the CD and first fixed guide member 9 to be applied to the CD whereby the CD is drawn into the housing. It should be noted that the CD rolls over the guide surface of the bottom of the slot in the first fixed guide member 9, and is retained against vertical movement by the two side walls of the slot.

Figure 3:
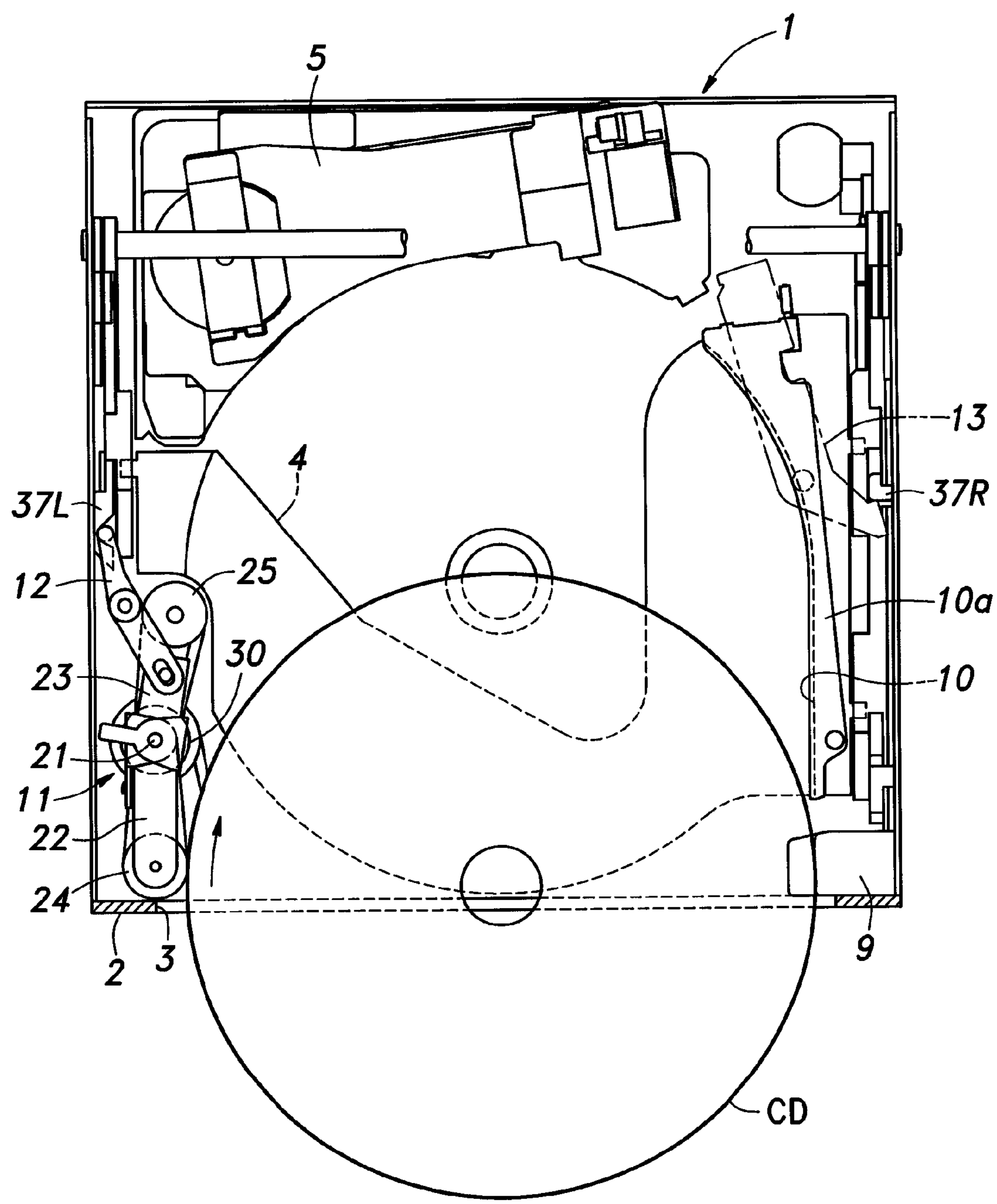
FIG. 3 is a simplified plan view showing a step in the process of transferring the disk.

As the CD progresses into the housing, the first arm 22 tilts outward by being pressed by the outer peripheral edge of the CD. However, since the first arm 22 is resiliently urged by a torsion coil spring wrapped around the center shaft 21 in an inward direction, the first transfer roller 24 pushes the outer peripheral edge of the CD and this causes the CD to continue to be drawn into the housing, aided by the rotation of the first and second transfer rollers 24 and 25 (See FIG. 3). It will be understood from FIG. 3 that the CD (information storage disk) moves along a substantially single straight path from the slot to a play position, i.e., the CD is drawn into the housing and to the play position along a substantially single straight path.

Figure 4:
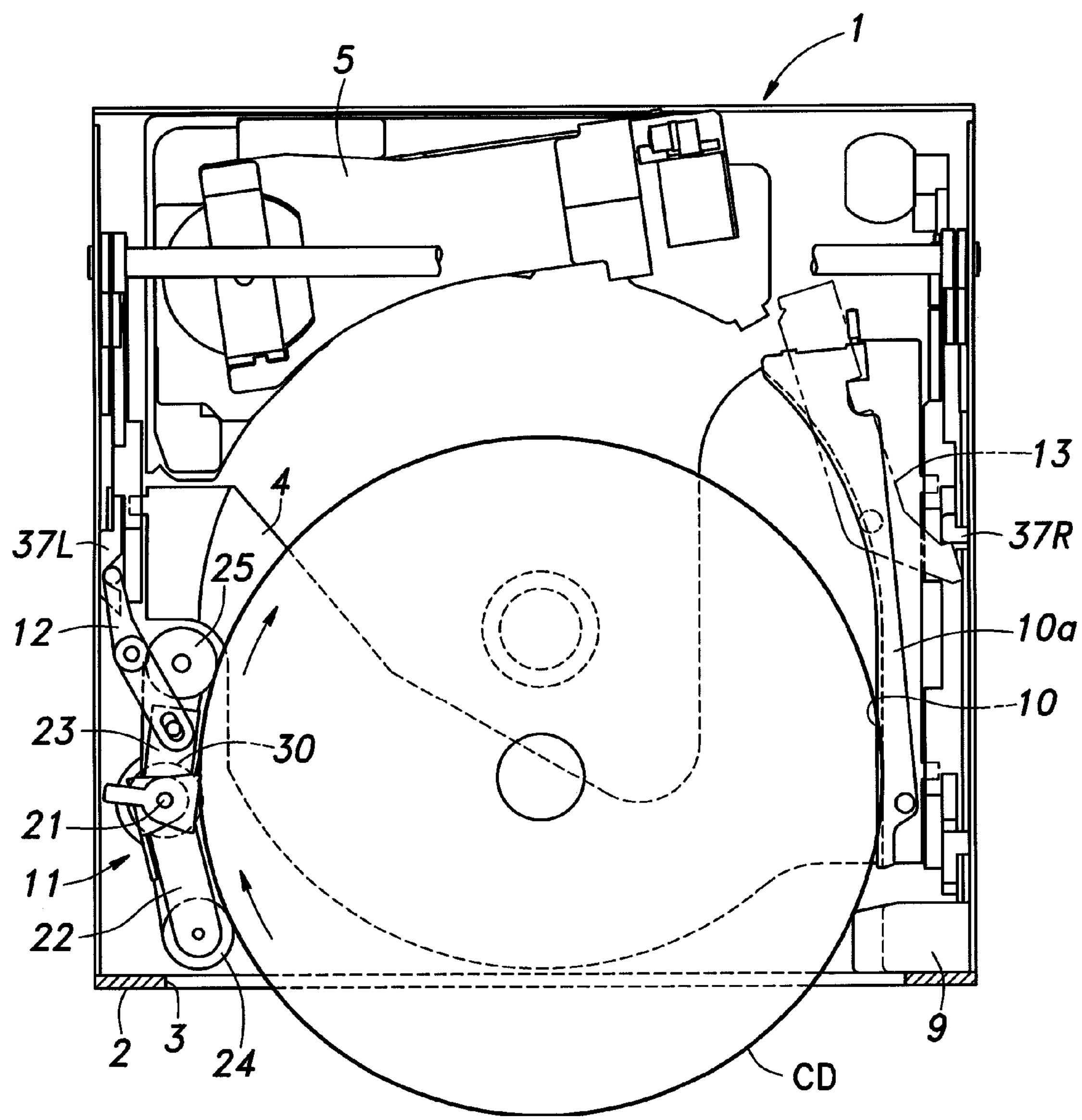
FIGS. 4 to 6 are views similar to FIG. 3 showing different steps in the process of transferring the disk.
Figure 5:
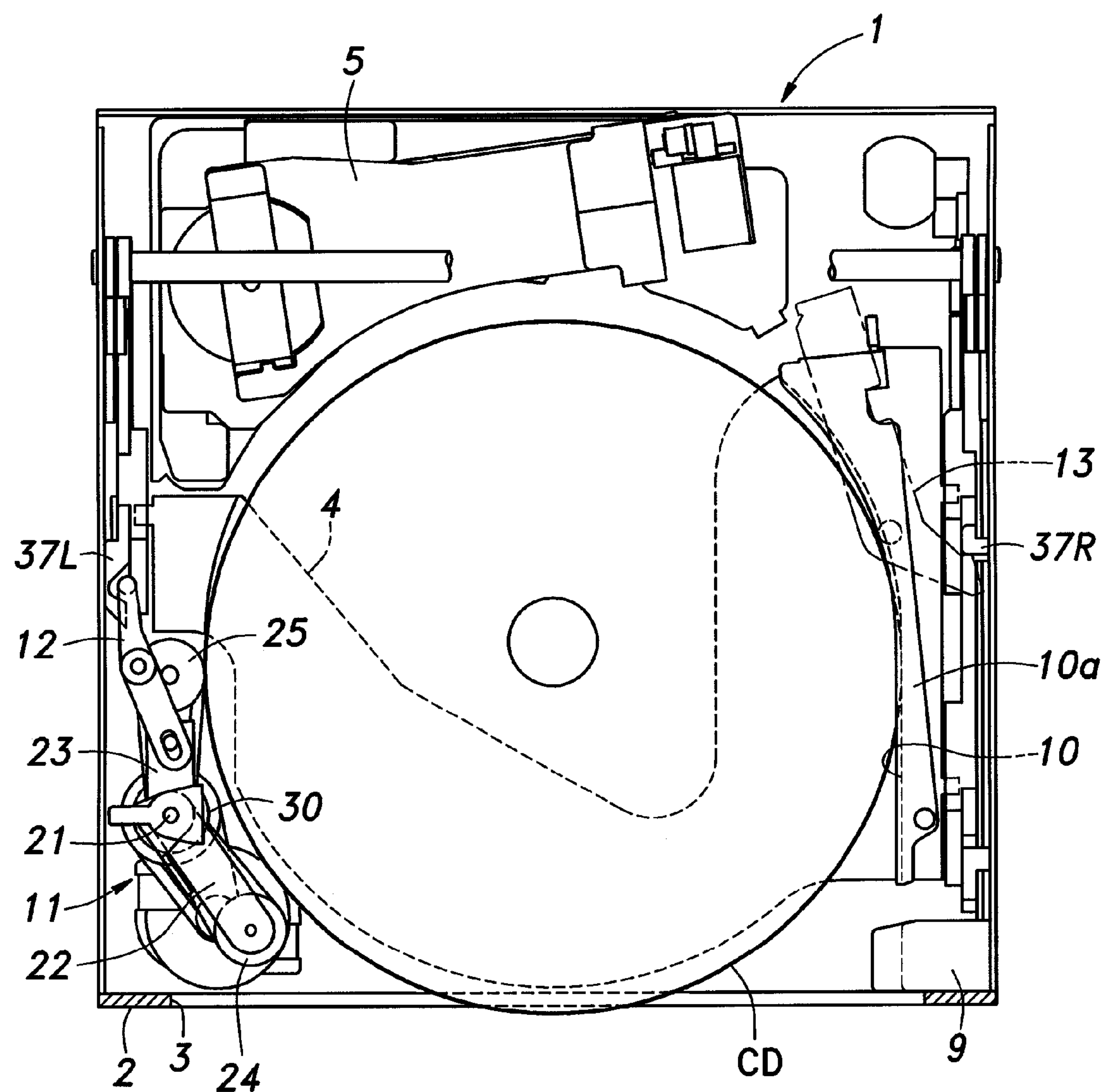

As the drive force of the first transfer roller 24 causes the CD to move progressively into the housing, the outer peripheral edge of the CD comes to be supported by the intermediate transfer roller 30, and is eventually supported also by the second transfer roller 25 which also applies a drive force to the outer peripheral edge of the CD. At the same time, the right hand side of the outer peripheral edge of the CD is guided by the second fixed guide member 10 fitted with the moveable guide plate 10*a* along the right side edges of the trays 4. (See FIG. 4.)

As the CD moves further into the housing, the CD is eventually disengaged from both the first and intermediate transfer rollers 24 and 30, and comes to be engaged only by the second transfer roller 25. The second arm 23 tilts outward because the second transfer roller 25 is pushed against the outer peripheral edge of the CD, but the CD continues to be drawn into the housing because the engagement between the second transfer roller 25 and CD is maintained owing to the resilient biasing force of the torsion coil spring wrapped around the center shaft 21.

Figure 6:
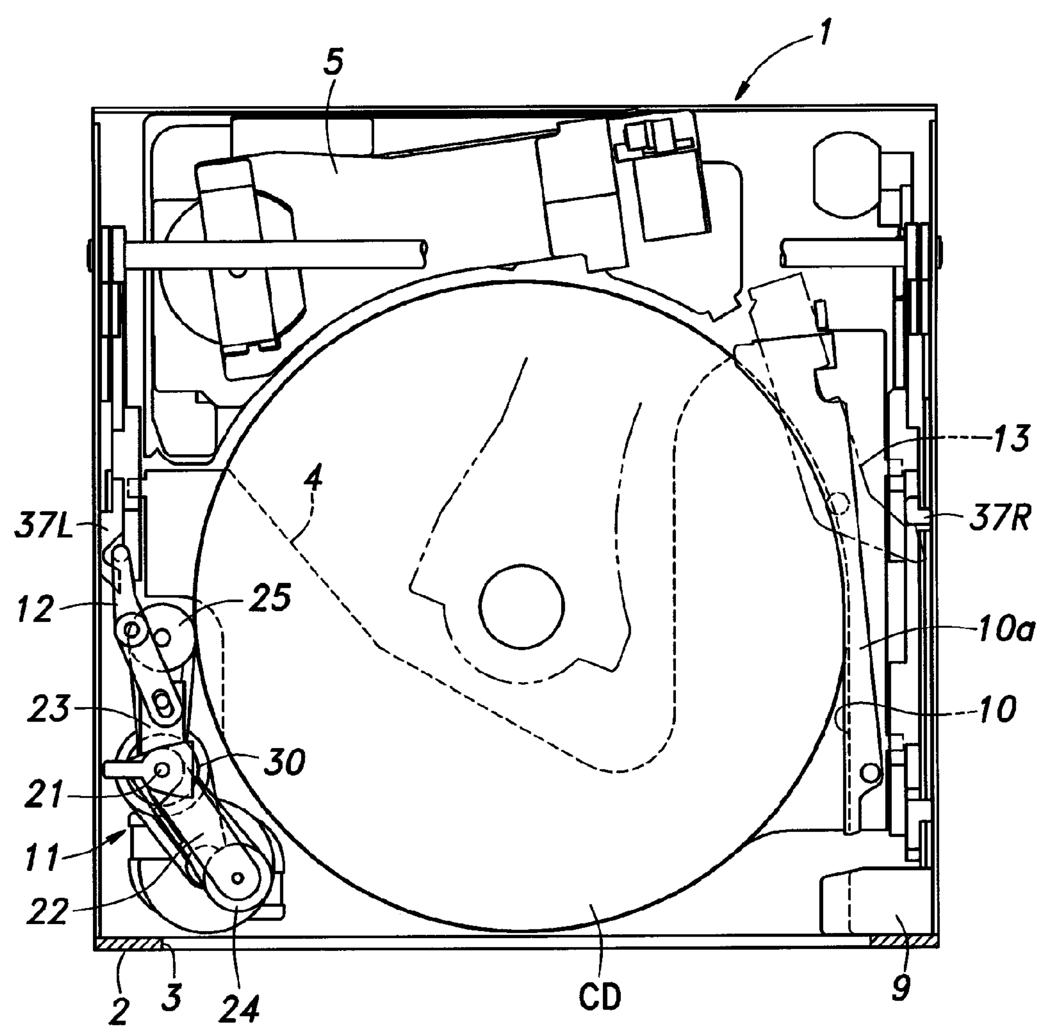
Figure 7:
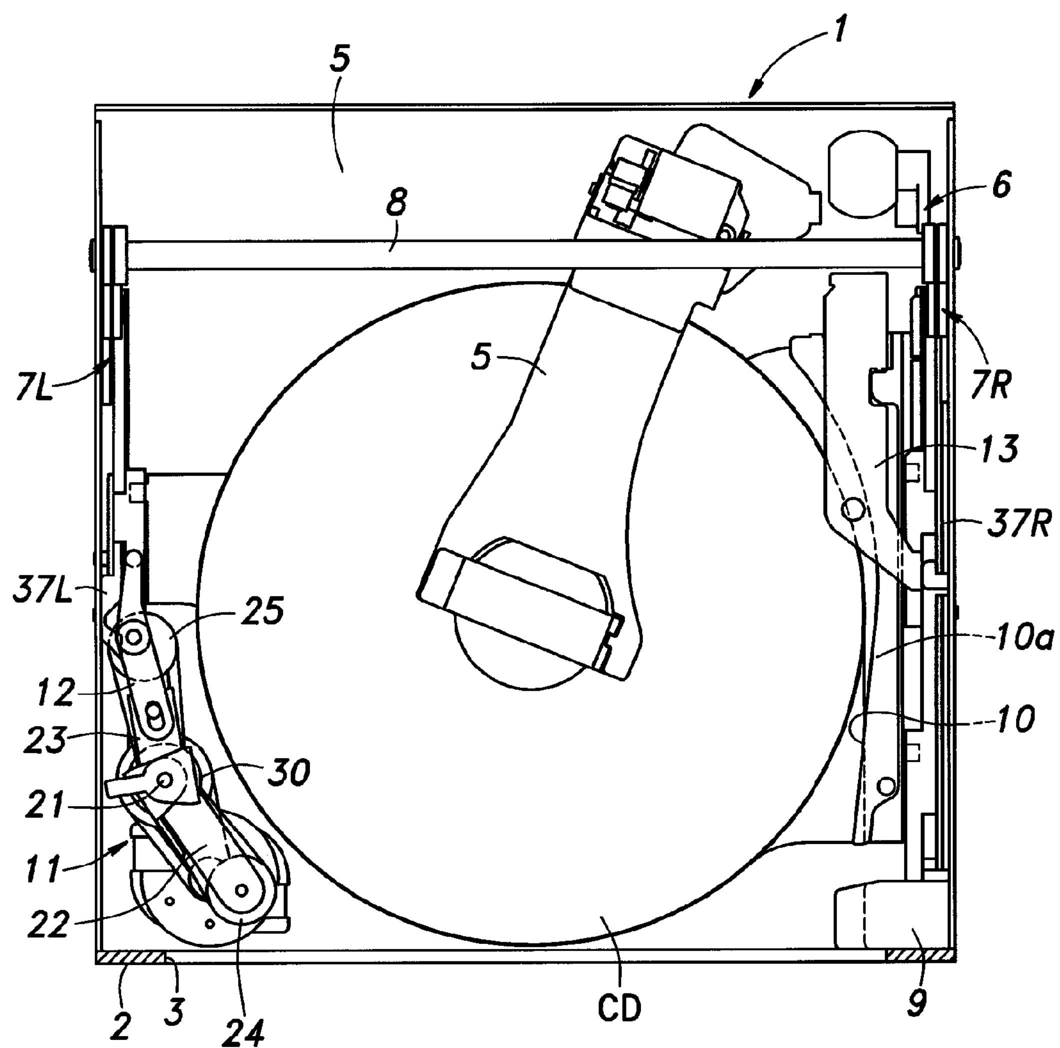
FIG. 7 is a view similar to FIG. 3 showing the disk transfer mechanism when the CD at the play position.

Once the CD has reached the play position as illustrated in FIG. 6, the transfer motor 33 is stopped and the drive arm 5 is turned to the position for clamping the center hole of the CD while the release cams 37L and 37R located on either side of the housing that cooperate with the two parts 7L and 7R of the auto-changer mechanism advance. This causes the left release cam 37L to push the first release lever 12 into a clockwise rotation. The first release lever 12 has an intermediate portion pivotally attached to the top panel, one end engaged by the left release cam 37L and another end engaged by the second arm 23. As a result, the second arm 23 tilts outward and causes the second transfer roller 25 to be disengaged from the outer peripheral edge of the CD. At the same time, the right release cam 37R pushes the second release lever 13 on the right hand side into a clockwise rotation, thereby pushing the free end of the moveable guide plate 10*a* outward, out of engagement from the outer peripheral edge of the CD. Thereafter, the tray 4 along with the moveable guide plate 10*a* are slightly lowered while the disk is clamped on the drive arm 5. Thereby, the tray 4 including the moveable guide plate 10*a* as well as the second transfer roller 25 are entirely disengaged from the CD, and place the CD ready to be played as illustrated in FIG. 7.

The eject action is executed by reversing the process described above. First of all, the corresponding tray 4 is raised until the CD sits on the tray 4, and the free end of the moveable guide plate 10*a* is returned to the more inward position by turning the second release lever 13 in the counter clockwise direction. At the same time, the second transfer roller 25 is made to engage the outer peripheral edge of the CD so as to push the CD against the second fixed guide member 10 of the tray 4 by turning the first release lever 12 in the counter clockwise direction. As a result, the CD is fixed in position on the tray 4 by the moveable guide plate 10*a* and second transfer roller 25. Thereafter, the drive arm 5 is released from the clamped state and turned to the retracted position, and the transfer motor 33 is turned in the opposite direction with the result that the rotational force of the second transfer roller 25 is applied to the outer peripheral edge of the CD and the CD is ejected to the recovery position outside the housing via the intermediate transfer roller 30 and first transfer roller 24.

As can be appreciated from the foregoing description, according to the present invention, a moment centered around the point of contact between the CD and first fixed guide member 9 or the second fixed guide member 10 of the corresponding tray 4 is applied to the CD jointly by the rotational forces of the transfer rollers 24, 25 and 30, and this causes the CD to be drawn into the housing. During this process, the action of transferring the CD is taken over one after another by the first transfer roller 24, intermediate transfer roller 30 and second transfer roller 25 that are arranged in mutually spaced relationship in the fore-and-aft direction so that the CD can be transferred by using a minimum number of transfer rollers, and a uniform transfer speed can be accomplished because the CD is transferred by the rotational forces of the transfer rollers until the CD reaches the final position. Also, because the path of the transfer movement of the CD is substantially straight, the space efficiency in the housing can be maximized.

In particular, if the pair of arms 22 and 23 supporting the first and second transfer rollers 24 and 25, respectively, are individually pivotally supported and resiliently urged, the transfer rollers 24 and 25 are enabled to move along the outer profile of the CD without requiring other moveable parts or a power source so that the overall structure can be simplified and the space efficiency can be maximized at the same time.

Additionally, if the release cams 37L and 37R serving as the retracting means for moving the second transfer roller 25 or the moveable guide plate 10*a* to a position that does not interfere with the CD is made to synchronize with the auto-changer mechanism, the overall structure can be simplified even further.

Although the present invention has been described in terms of a preferred embodiment thereof, it is obvious to a person skilled in the art that various alterations and modifications are possible without departing from the scope of the present invention which is set forth in the appended claims.

What is claimed is:

1. A disk drive device, comprising:

a housing defining a slot for receiving and ejecting an information storage disk;

a tray provided in the housing for supporting said information storage disk;

a first transfer roller provided in the housing adjacent to an end of the slot for engaging a peripheral side edge of the disk, the first transfer roller being provided with a pivot center extending perpendicularly to the slot;

an electric motor for rotatively actuating the first transfer roller;

an immovable fixed guide member provided in the housing adjacent to the other end of the slot for engaging an opposite peripheral side edge of the disk; and the information storage disk moving along a substantially single straight path from the slot to a play position.

2. A disk drive device comprising:

a housing defining a slot for receiving and ejecting an information storage disk;

at least one tray provided in the housing for selectively supporting said information storage disk;

a first transfer roller provided in the housing adjacent to an end of the slot for engaging a peripheral side edge of the disk, the first transfer roller being provided with a pivot center extending perpendicularly to the slot;

an electric motor for rotatively actuating the first transfer roller; and a first fixed guide member provided in the housing adjacent to the other end of the slot for engaging an opposite peripheral side edge of the disk;

wherein the first transfer roller is pivotally attached to a free end of a first arm having a base end pivotally attached to a part of the housing so as to be rotatable around a pivot center located behind the first transfer roller and extending in parallel with the pivot center of the first transfer roller, and the device further comprises a spring member that resiliently urges the free end of the first arm inwardly toward the peripheral side edge of the disk.

3. A disk drive device according to claim 2, further comprising a second transfer roller located more rearwardly in the housing than the first transfer roller and pivotally attached to a free end of a second arm having a base end pivotally attached to a part of the housing so as to be rotatable around a pivot center located in front of the second transfer roller and extending in parallel with the pivot center of the second transfer roller, and the device further comprises a spring member that resiliently urges the free end of the second arm inwardly toward the peripheral side edge of the disk.

4. A disk drive device according to claim 3, wherein the base ends of the first and second arms are pivotally supported by a common shaft.

5. A disk drive device according to claim 3, further comprising an auto-changer mechanism and a lever arm adapted to retract the second transfer roller away from the peripheral edge of the disk to a position clear from the disk in cooperation with an auto-changer mechanism when the disk is at a play position.

6. A disk drive device according to claim 5, further comprising a second fixed guide member provided along a side of the tray for engaging the opposite peripheral side edge of the disk.

7. A disk drive device according to claim 6, further comprising a moveable guide member provided along a side of the tray for selectively retaining the disk against an upward movement, and a lever arm adapted to actuate the moveable guide member between a deployed position for retaining the disk against upward movement thereof and a retracted position for permitting upward movement of the disk from the tray.

8. A disk drive device according to claim 7, wherein the base ends of the first and second arms are pivotally supported by a common shaft, and a rotor is coaxially and rotatably mounted on the common shaft, the rotor being provided with a first pulley for transmitting a rotational movement of the motor to the rotor via a belt, a second pulley for transmitting a rotational movement of the rotor to the first transfer roller via a belt and a pulley formed integrally with the first transfer roller, and a third pulley for transmitting a rotational movement of the rotor to the second transfer roller via a belt and a pulley formed integrally with the second transfer roller.

9. A disk drive device according to claim 8, further comprising an intermediate transfer roller formed in the rotor to engage the outer peripheral edge of the disk as the disk is transferred between the first and second transfer rollers.

10. A disk drive device according to claim 9, wherein the intermediate transfer roller has a lower frictional coefficient that the first and second transfer rollers.

11. A disk drive device according to claim 9, wherein the first, second and intermediate rollers are all disposed at the same height.

* * * * *

UNITED STATES PATENT AND TRADEMARK OFFICE

CERTIFICATE OF CORRECTION

PATENT NO. : 7,266,828 B2
APPLICATION NO. : 10/905349
DATED : September 4, 2007
INVENTOR(S) : Inoue It is certified that error appears in the above-identified patent and that said Letters Patent is hereby corrected as shown below:

Title page:

In section (74), *Attorney, Agent, or Firm*, change "William D. Blackamn" to --William D. Blackman--.

Column 3:

Line 1, change "may be favorable" to --may be favorably--.

Line 24, change "when the CD at" to --when the CD is at--.

Lines 36-37, change "a stack of trays 4 each adapted to retain a CD is provided" to --a stack of trays 4, each adapted to retain a CD, is provided--.

Line 40, change "a disk damper" to --a disk clamper--.

Line 51, change "trays 4 stacked one over the other by" to --trays 4, stacked one over the other, by--.

Column 4:

Line 16, change "fixed guide members" to --fixed guide member--.

Line 20, change "to serve a means" to --to serve as a means--.

Line 24, change "to serve a means" to --to serve as a means--.

Column 5:

Line 59, change "counter clockwise" to --counterclockwise--.

Column 6:

Line 64, change "in the counter" to --in the counter- --.

Column 7:

Line 2, change "counter clockwise" to --counterclockwise--.

UNITED STATES PATENT AND TRADEMARK OFFICE

CERTIFICATE OF CORRECTION

PATENT NO. : 7,266,828 B2
APPLICATION NO. : 10/905349
DATED : September 4, 2007
INVENTOR(S) : Inoue It is certified that error appears in the above-identified patent and that said Letters Patent is hereby corrected as shown below:

Column 10:
Line 3, change “that the first” to --than the first--.

Signed and Sealed this

Third Day of June, 2008

JON W. DUDAS
*Director of the United States Patent and Trademark Office*